June 12, 1956 — H. T. BATTIN — 2,749,931
UNITARY TUBE VALVE AND CAP
Filed Aug. 26, 1949 — 3 Sheets-Sheet 1

INVENTOR.
Harold Taylor Battin
BY
Warren Dunham Foster
Attorney

June 12, 1956 — H. T. BATTIN — 2,749,931
UNITARY TUBE VALVE AND CAP
Filed Aug. 26, 1949 — 3 Sheets-Sheet 2

INVENTOR.
Harold Taylor Battin
BY
Attorney

June 12, 1956　　　H. T. BATTIN　　　2,749,931
UNITARY TUBE VALVE AND CAP
Filed Aug. 26, 1949　　　3 Sheets-Sheet 3

INVENTOR.
Harold Taylor Battin
BY
Warren Dunham Foster
Attorney

United States Patent Office 2,749,931
Patented June 12, 1956

2,749,931

UNITARY TUBE VALVE AND CAP

Harold Taylor Battin, Ridgewood, N. J.

Application August 26, 1949, Serial No. 112,457

27 Claims. (Cl. 137—233)

This invention is an automatically self-sealing and self-cleaning auxiliary valve for use with standard valves furnished as factory equipment upon inner pneumatic tubes or alternatively produced as a complete unit. A user merely screws my auxiliary unitary valve and cap into the position now occupied by a conventional dust cap. My device avoids the constant loss of these caps when air is being applied to a tire and the needless expenditure of time, great in the aggregate, of the removal and replacement of present valve caps, particularly important on trucks and busses upon which air pressure is checked daily. If my auxiliary valve is removed from the main valve the tube is automatically deflated, thus affording complete practical insurance against present losses of valve caps which run literally into millions annually. If a core of a main valve needs replacing in one form hereof it is instantly removed by the mere act of removing my auxiliary valve. If a main valve leaks this release of air pressure immediately closes my auxiliary valve more tightly. Upon the accidental loosening of the core of the inner valve it can be tightened instantly by turning my auxiliary cap in one direction, but if turned oppositely my auxiliary valve and the core of the main valve are removed, taking the core of the main valve with it in one embodiment. Before inflation a user preferably pushes downwardly on the external closure of my auxiliary valve thus releasing air at high velocity to remove dirt in either valve and if remaining might prevent the proper closing.

The addition of my valve to a tube does not require balancing because its parts are small and light and hence at revolution at high speed have little centrifugal effect. No parts protrude at the side. The additional weight of my valve over a conventional cap is in fractions of an ounce. The parts are small and inexpensive. Assembly with an existing valve requires no more skill or strength than the screwing on of an ordinary dust cap which my invention replaces. A tube with my unitary valve and protective cap may be filled by hose attachments now in use. Tolerances are liberal, my mechanism adjusting itself for slight variations.

For many years the automobile industry has vainly sought a tube capping device which has the above characteristics. Many previous devices to accomplish the above ends have required the use of an entirely new device which must be installed by a tube manufacturer at his plant. Such changes are economically impracticable. Other previous devices have been expensive or cumberous or complicated or have added much weight to the valve mechanism or have required a rebalancing of the tire. Other previous proposals have made renewal of a valve core, an operation often necessary, without removing the valve. The above will make clear that I have overcome the above, and other, disadvantages of the prior art.

In its various forms my invention consists essentially of a unitary self-sealing auxiliary combined valve and cap which is initially screwed into place upon the end of a valve, hereinafter called a "main valve" or a "primary valve," of a tube as is the present cap which must be removed every time a tire is inflated. When once screwed into position my device remains there until renewal of the core of the main valve. Then in one form of my invention it and the core of the original valve are removed together and the air rushes out. In another form, the air escapes more slowly and the core is completely removed as a separate operation. Thus in either form if a careless or larcenous service station attendent unscrews the valve without reason he deflates the tire and thus makes evident his carelessness or evil intention. The mere act of placing an ordinary hose fitting of a service station upon the top of my device opens the valve and permits air to enter the tube. Preferably preliminary pressure should be applied merely to release a short blast of air from the tube to clean the cap.

In its essence my invention consists primarily of an outer rotatable actuating shell having a valve therewithin auxiliary to a main tube valve and a slip clutch or wrench which is automatically effective when the operating shell is screwed upon the main valve to make firm contact with and when necessary or desired seat the core of the main valve, irrespective of the relative positioning of the internal parts at that time, and when it is unscrewed automatically to loosen or remove the core so that air escapes from the tube either slowly or rapidly. This clutch provides lost motion irrespective of the accidental positioning of the parts and permits my outer protective cap to be screwed into completely protective position after the core has been completely seated. The unseating of the core upon contrary movement, however, is positive. One end of this auxiliary valve forms a self-sealing cap for the entire valve structure and the other end, upon depression of its closure and attached plunger, operates the main valve. Although my invention is particularly well adapted to and primarily intended for use with conventional tube valves, such as the Dill (with which my invention is illustrated) or the Schroeder, they both may be made and sold as a unit.

I have described and illustrated my invention as applied to or as a part of valves of known and widely used types for pneumatic tubes adapted for insertion within automobile tires. My invention, however, may be applied to any type of valve, particularly that of a container for a gas, which must be frequently attached to and detached from a reservoir or pump. It will therefore be understood that I am using such words as "tube" and "tire" as merely illustrative.

Although I am showing only certain preferred forms of my invention it will be readily understood that changes may be made without departing from the spirit of my invention or the scope of my broader claims. Among the objects of this invention is the provision of a simple, inexpensive, practicable auxiliary tube valve or unitary self-sealing tube valve which serves both as a protective cap and valve thus permitting inflation of a tube without its removal and including characteristics which make loss or theft extremely unlikely, the whole structure being applicable to existing valves or constructed therewith, my device automatically seating and unseating a core of a main valve and permitting its easy replacement. Other objects include improved construction of a self-sealing tube valve and the parts thereof, either as auxiliary to a conventional main valve or as unitary therewith, and improved construction of an auxiliary valve for intimate, improved and novel cooperation with a main valve and its several parts.

In the drawings:

Figures 4, 5, 6 and 7 (Sheet 2), taken together form in effect an exploded isometric view of certain of the vital and cooperating parts of my device of the form of Figures 1 and 2.

Figure 4 is such a view of my plunger, Figure 5 of an outer shell, Figure 6 of my novel clutch and wrench device and Figure 7 of a conventional valve core intimately cooperating with my device.

Figure 8 (Sheet 3) is an illustration of a preferred modification of my invention, likewise in vertical section and generally corresponding to Figure 1. In this illustration the removal of my auxiliary valve merely loosens the main core, allowing rapid but not instant deflation. Thereafter the main core may be completely removed in the usual manner. Figure 8 shows my device before it has been screwed completely into place and a core of a main valve completely seated.

Figures 9, 10 and 11 together form an exploded isometric view of the form of my invention of Figure 8.

In the following description and in the sub-joined claims except as specifically stated the point of view is that of my unitary valve and cap placed upon or constructed with a conventional valve of a pneumatic tube which is mounted upon a tire upon a vehicle which is at rest as upon a level pavement or other support, with the tire so positioned that the entire valve structure is disposed at its position nearest to the pavement. The parts so appear in the drawings. Although I am aware that many present valves, particularly for use upon trucks and busses, do not then extend in a direction vertical to the pavement but are bent to one side for simplicity of phrasing I assume in the terminology hereof that the principal axis of the valve is longitudinal and vertical and extends directly upwardly, such terminology, however, being used to cover a bent valve. Such words as "lower" and "downward" indicate relatively close relation to a tube or other reservoir with which a valve is used and "upper" and "upward" relatively distant relation. "Inner" and "outer" and similar words are used from the point of view of location in a direction substantially normal to the principal axis of the valve. It will be understood that the principal and longitudinal axes of both a main and auxiliary valve coincide. It is of course understood that the axes of the valve is of such structures in themselves and not when revolving with an automobile tube.

For a full understanding of my invention I must first describe a tube valve per se, for purposes of illustration only shown as the Dill.

Figure 1:
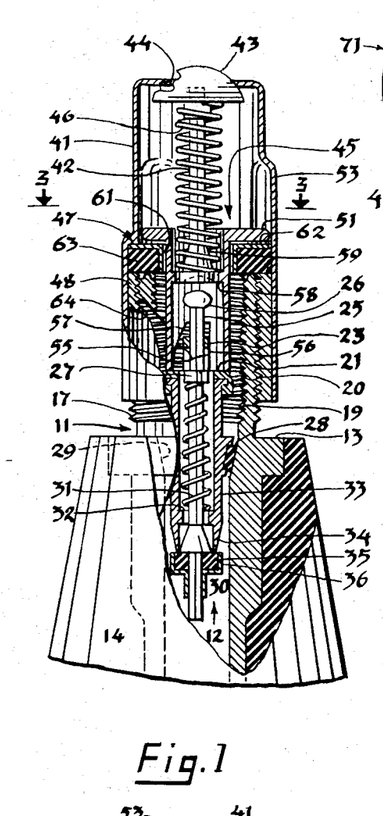
Figure 1 is a vertical view largely in section and largely broken away of a preferred form of my invention shown as applied to or constructed with a main or inner valve of the Dill type. In this illustration of my invention the removal of my auxiliary valve also unscrews the core of the main valve, which is then blown out and the tire instantly deflated.

This valve, herein called a main or primary valve, consists essentially of a stem or tubular structure forming an outside shell 11 and an inner core generally indicated as 12. See Figures 1 and 2. An upwardly extending shoulder 13 is fixed in a rubber pyramidal protuberance 14 from the tube body. An outer circumferential thread 17 is provided for a cap, either a conventional dust cap or my own unitary device. An inner circumferential thread 19 on this stem co-acts with a thread 20 upon a standard valve nut 21. The top of this nut is a transverse bar 23 which serves as a motion-receiving head and forms a very important element for close co-action with my invention.

This head is a square-sided formation or bar on the top of a nut extending entirely across the core, but leaves a free space beyond each of its parallel and vertical sides, thus making easy engagement with a wrench which is provided either independently or as the top of a dust cap of certain types so that the core may be originally inserted into seated or sealing position and removed therefrom by the rotation of this head. The main valve can function only when the core is so seated, and all air is released when it is unseated. Such removal is frequently necessary so that a new core may be introduced. A plunger 25 having a rounded head 26 and a spring retaining collar 27 extends freely through an opening in the center of this nut and operates the valve. A rubber seal 28 co-acts with beveled sides or shoulder 29 of the interior opening 30 of the stem of the main valve. A spring 31 surrounds plunger 25 and rests on shoulders 32 of an inner shell 33 and between these shoulders and collar 27. A guiding foot 34 of this shell rests upon a rubber washer 35 supported by a collar or bracket 36 attached to and movable with plunger 25. A conical guiding formation of the foot engages a corresponding conical formation with oppositely disposed planes lower upon plunger 25. The rubber washer 28 rests fixedly against the shoulder 29 and air passes between the shell 33 and the rod 25 when that plunger is depressed to open the valve.

Upon the depression of plunger 25 contact with its head will move collar 36 and washer 35 away from foot 34 of the stem leaving therebetween an opening through which air may flow (Figure 2) thereby opening the valve. When pressure is released from this plunger spring 31 restores the parts to the closed position shown in Figure 1. Thus the essential valve mechanism is a part of the core, which is supported within the stem.

I shall now describe my novel device and the novel elements thereof in combination with known main valve mechanisms such as described above. My unitary protective cap and auxiliary or secondary valve consists primarily of an outer operating shell 41, a plunger of valve pin 42 having a sealing head or closure 43 semi-hemispherical in shape coacting with a central upper opening 44 of the shell, a wrench or clutch or ratchet formation generally indicated as 45, spring 46, inner seat member 47, and lower retainer or inner mounting shell 48. This formation and its spring form a slip clutch, the spring both powers this clutch and operates my auxiliary valve.

Figure 3:
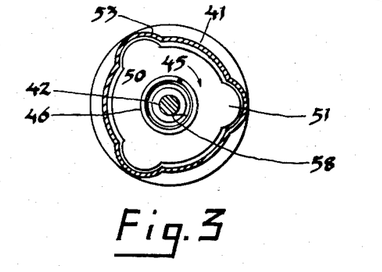
Figure 3 is a horizontal section taken on the line 3—3 of Figure 1 and looking in the direction of the arrows.
Figure 4:
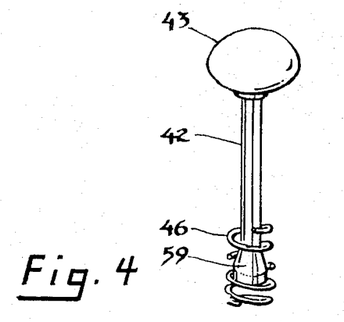
Figure 5:
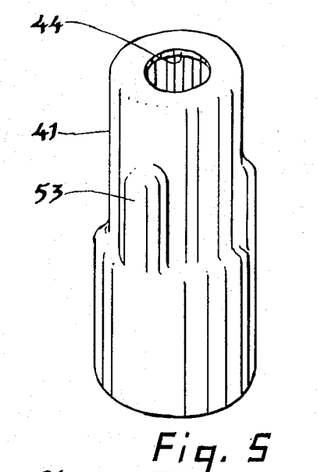
Figure 6:
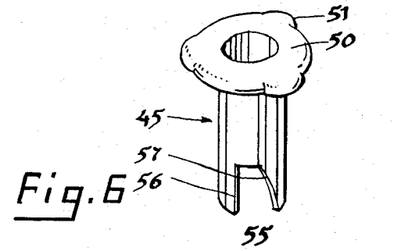
Figure 7:
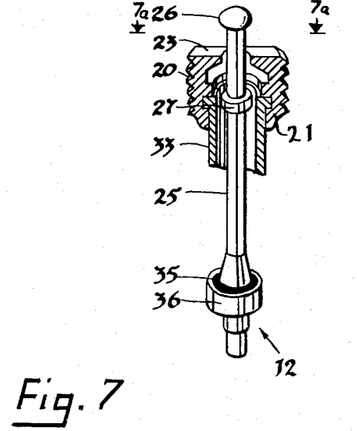
Figure 7A:
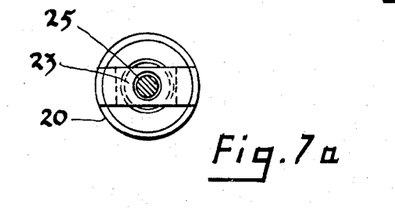
Figure 7a is a view partly in section taken on the line 7a—7a of Figure 7 looking in the direction of the arrows.

This wrench 45, shown alone in Figure 6, is a most important and characteristic element of this invention. Its upper portion consists of an outwardly projecting annular rim 50 with a plurality of lips 51 engaged by and movable by contact with inner surfaces of protuberances or bulges 53 formed in the outer shell. See Figures 3, 5 and 6. The downward portion of this clutch terminates in a double-sided wrench formation 55 each side of which has one square or vertical or straight edge or surface 56 and one angular edge or surface 57. The angular edge leads when my device is being screwed downwardly into operative position and vertical edge leads when it is being unscrewed. Co-action between these edges and the motion-receiving head 23, is highly important. An annular inwardly extending shoulder 58 (Figures 1 and 3) serves as a seat or support for spring 46 (having a central opening through which the plunger passes) and also as a vertical guide for a lower cupped or conical end 59 of the plunger 42. This cup formation co-acts with the rounded top 26 of the main plunger 25.

Seat member 47 is an annulus in horizontal cross section with a tubular portion 61 depending from a horizontal shoulder forming an extension normal to the axis of the tubular portion. A rubber gasket 63 in the right-angled formation thus created perfects an air seal. Retainer ring or inner mounting shell 48 has an internal thread 64 engaging the threads 17 of the main valve stem and a smooth outer surface pressed into engagement with shell 53 or spot welded to prevent loosening. Outer shell 53 and this ring thereby form a shell structure which may be screwed to and from operative or seated position upon the stem of the main valve and attaches my auxiliary valve and cap to a main valve. Thus the wrench and clutch formation is mounted within the outer shell by means which include instrumentalities operatively interconnected to the attaching means so that when the shell is rotated the core is firmly seated.

The assembly of my device is simple. In the following portion of this description only it should be assumed that the parts are rotated 180 degrees from the position of the drawings and previously described. First plunger 42 with spring 46 about it is dropped in place in shell 41, closure head 43 protruding through opening 44. Then clutch and wrench member 45 is placed below the spring. Thereupon seat 47 is swedged into position within shell 41. Finally retainer 48 is pressed into position below seat 47 in a relatively lower portion of shell 41, and my device is complete. All that remains is to screw it on a conventional valve of any type now commonly used in the United States.

As my auxiliary unitary valve and cap is screwed into position upon a conventional valve as is an ordinary valve dust cap, the irregularly shaped motion-transmitting wrench elements 56 may or may not conflict with the motion-receiving surfaces of head 23 of the main valve. The pitch of threads 64 is such that if this conflict occurs the clutch and wrench formation 45 will ride up against the pressure of the spring 46 as rotation continues until the surfaces 56 and 57 of this wrench formation pass over the top of the head. If the valve core is not then seated there will be sufficient friction between the inclined edge 57 and the right-angled motion-receiving head 23, which is being forced downwardly by spring 46, so that the valve core will be rotated downwardly and brought finally into position. I have found an angle of 40 degrees from the vertical highly satisfactory. This angle must be such that contact between its surface and that of the motion-receiving head furnishes sufficient power so that the head is rotated when my device is rotationally moved toward operative position yet sufficiently yielding that if the wrench surfaces do not happen to pass upon each side of the motion-receiving head when first placed into position and hence engage they will easily ride over and slip into place. Thus the valve core, if loose or if a fresh one is to be inserted, is rotated into air-retaining position as my combined cap and valve is screwed home. Therefore the use of a conventional small wrench is unnecessary.

This lost motion device is highly important for another reason. With the main valve core firmly in place and with the wrench formation in engagement with head 23 my auxiliary valve must be screwed down tightly to form a seal between its gasket 63 and the top of the valve stem. This angular formation 57 and the spring pressure back of it provide the necessary lost motion. When turning force is applied to the auxiliary valve with the main valve in place the wrench mechanism rides up against its spring and over the square edge of the head. This operation is repeated until the auxiliary valve is seated tightly, the wrench or ratchet continuing to ride up and down as it passes over the top of the square head.

When a user desires to remove the valve stem he merely screws my auxiliary unitary valve and cap in the opposite direction. Then one of the straight sides 56 of the wrench squarely engages a parallel vertical side of the motion-receiving head of the core and immediately rotates the core out of the main valve. The relative position and length of threads 17 and 64 are such that as the cap is screwed upwardly it lifts and simultaneously revolves the wrench formation to an extent which completely removes the core from the internal threads of the main valve. The tire is immediately deflated. Thus the valve core may easily be removed. Equally important is that if my auxiliary valve and cap is removed the air rapidly escapes from the tube. Thus both carelessness and petty larceny are much discouraged. In this embodiment the wrench formation and cap rotate together irrespective of their positions along the stem of the main valve because of the relative extent of the external threads on the stem and the internal threads on my shell formation and the mounting of the formation for bodily upward movement with the outer shell. Thus the rotation upwardly of my device completely unscrews the core, allowing all air to escape at once from the tire.

Figure 2:
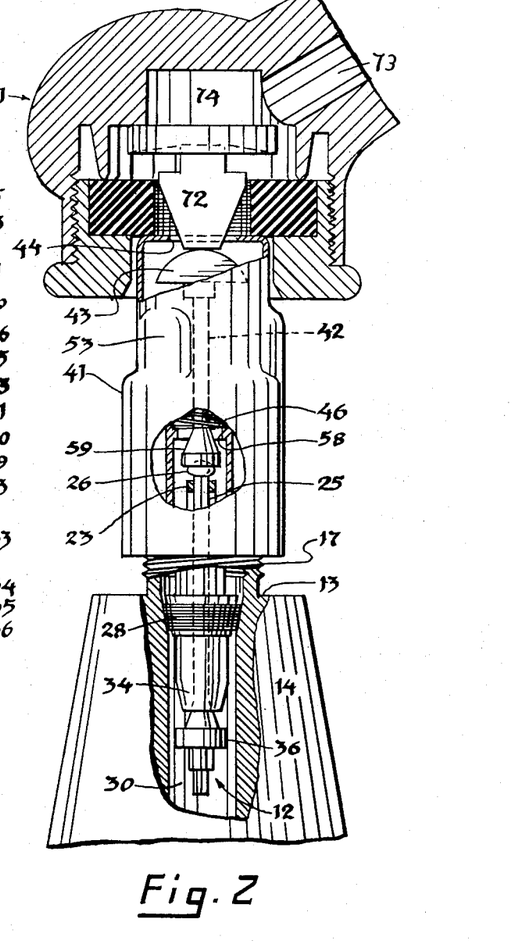
Figure 2, partially broken away and partially in section, corresponds to Figure 1. It shows my valve in use with a connection to a conventional hose pump of a filling station.

The inflation of a tube with my device thereon is seen in Figure 2. First, depression of closure 43 permits a blast of air to remove any dust or mud which prevents a firm seal after re-inflation. A conventional air filling nozzle generally indicated as 71 is brought against the top of my auxiliary valve, a plunger 72 engaging head 43 and forcing plunger 42 downwardly against the pressure of spring 46. The end of plunger 42 thereupon engages the head 26 of plunger 25 of the main valve against the pressure of both springs and opens it as described. Engagement of main valve head 26 with the periphery of the opening in motion-receiving head 23 prevents further movement. Thus air flows from the pump through channel 73 and chamber 74 into the tire. Longitudinal movement of the operative parts of the main valve is the same as at present, with abundant tolerance for manufacturing differences. Contrary to certain examples of the prior art I do not rotate the main valve core prior or subsequent to a regular inflating operation.

Figures 8 to 14 both inclusive show other embodiments of my invention which also exemplify many of the above principles.

Figure 9:
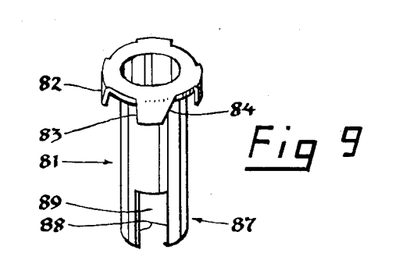
Figure 9 is such a view of a clutch and wrench member for use with the structure of Figure 8.
Figure 12:
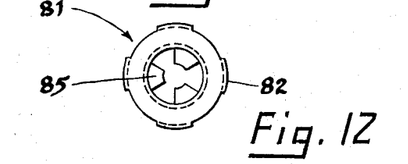
Figure 12 (Sheet 2) is a top plan view of a clutch and wrench member for use in the embodiments of my invention fully shown in Figures 8 and 14.
Figure 13:
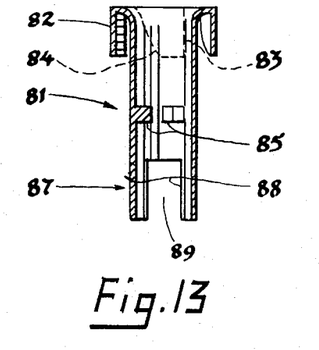
Figure 13 is a vertical section of the ratchet member of Figure 9 for use with the structures of Figures 8 and 14.

One chief difference between the form of my invention previously described and those which I am about to describe is that in the former the co-action between the bulges in the outer shell and the ratchet causes my device to rotate as a whole when the outer shell is revolved so that it can be screwed on and off while in the latter co-action between the clutch and wrench formation and an operating seat causes such movement. In the previously described form of my invention unscrewing of the auxiliary valve and cap removes the core of the main valve. In the latter the removal of the auxiliary device merely loosens the main core as best seen in Figures 9, 12 and 13 this formation consists preferably of a single piece of metal 81 which embodies downwardly extending actuating ears 82, with one edge 83 straight or vertical and the other 84 angular, which co-act with a seat member 91, later described and illustrated alone in Figure 10, to turn the mechanism with the shell, and inwardly extending lugs or studs 85 forming a seat upon which the bottom of the spring 86 rests. These lugs may be made from a solid piece as shown or may be constructed by turning a portion of the side of the tube inwardly.

The ends of these studs also engage and guide stem 104 later described, which passes through a central open space. This clutch or ratchet member is extended downwardly into a wrench formation generally indicated as 87 having straight sides 88. Upon rotation of this mechanism, these formations rotate the motion-receiving head as previously explained. In this form, however, the necessary lost motion is provided by an angular motion-transmitting edge 84 powered by spring 86 and rotated by the seat member. The space 89 between these wrench formations is cut materially deeper than the distance necessary for co-action with the head 23 of the valve stem and permits the passage of the air. The distance between the bottom of the actuating ears and the top of shoulder 92 must be at least as great as the height of the motion-receiving head to permit the ratchet to ride up and over the head and then drop down as my device is being seated and also to permit further downward movement of the outer shell after seating.

Figure 10:
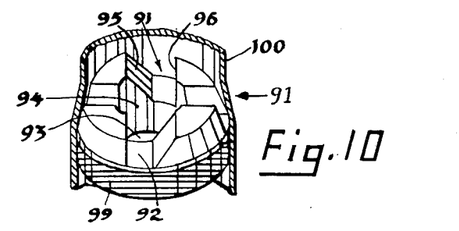
Figure 10 is a similar view of an operating seat member, largely broken away.
Figure 11:
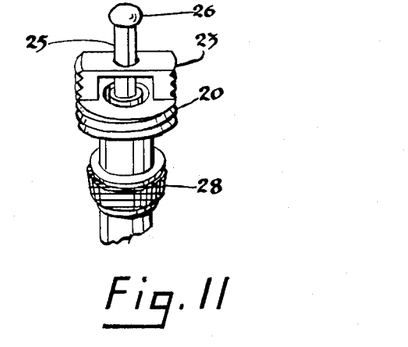
Figure 11 is a fragmentary isometric view of a conventional valve core to make clear its close cooperation with the novel elements of my device.

As will best be seen from Figure 10 upon Sheet 3, an operating seat member generally indicated as 91 is a unitary formation circular in horizontal cross section. Its upper portion comprises a largely solid shoulder 92 with a central opening 93 with walls 94 forming a tubular structure extending below the shoulder. The upper portion of this shoulder has openings bounded by motion-receiving surfaces 95 and 96 for engagement with the motion-transmitting clutch ears 82. Surfaces 95 are inclined and surfaces 96 straight or vertical to be operated by angular surfaces 84 and straight surfaces 83 respectively of ears 82, thus causing the device to rotate as a unit. A rubber gasket 99 is attached in the right angle between the bottom surface of shoulders 92 and the downwardly projecting tubular structure therebelow.

Figure 8:
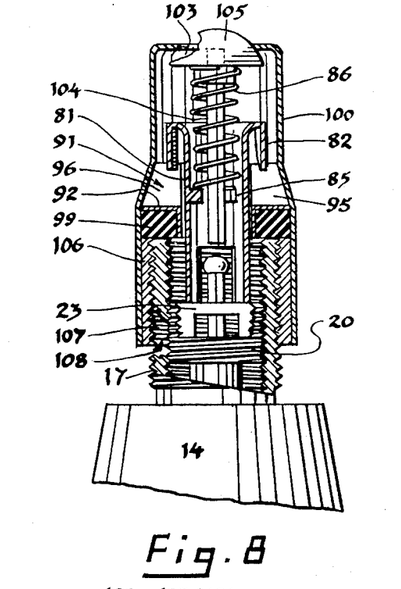

The outer shell for the form of my invention shown in Figure 8 generally characterized as 100 is without such formation as bulges 53 of the first described form as stated the immediately preceding portion hereof. An opening 103 accommodates a valve member having a plunger 104 and a head 105. A thermo-plastic material is satisfactory for this head. A retaining member for this form may be identic with that previously described. It includes a retainer member 106 having internal threads 107 and a central opening 108, threads 107 co-acting with external threads 17 of the stem to mount my auxiliary device upon the main valve.

The assembly of this form is equally simple. With the shell 100 diametrically opposite the position of the previous description and the drawings the plunger 104 and spring 84 are dropped into place and thereafter clutch member 81. Then seat member 91 is swedged in place, with the motion-receiving ears 82 of the wrench member co-operating with the motion-transmitting surfaces of the seat 91. Assembly is completed by pressing the threaded member into position.

When my device of this form is first placed upon a main tube valve it may assume the position shown in Figure 8, with the wrench resting on the top of the motion-receiving head of the core. As a user rotates shell 100, clockwise as illustrated, in screwing my valve and cap downwardly into position seat 91 revolves therewith. Motion is transmitted through surfaces 95 to surfaces 84 of the ratchet member. Continued downward rotation brings wrench 87 into the horizontal plane of motion-receiving head 23. If the wrench has not happened to engage the head the ratchet will be positioned as in Figure 8 supported by the head and held relatively upwardly. As the device is further revolved, however, by engagement of these inclined surfaces under pressure from spring 86 the vertical sides 88 of opening 89 come into alignment with the vertical sides of the head and spring 86 will force the wrench or ratchet downwardly. Further rotation will firmly seat the inner core, contact between the inclined surfaces 95 of the shell, forced downwardly by the spring, and 84 of the wrench formation 87 and motion-receiving head 23 furnishing the necessary power. Thereafter, during the necessary further rotation of shell 100, sufficient lost motion is provided so that the wrench rides over the head. As a user screws shell 100 upwardly to remove it, such movement being anti-clockwise as illustrative, positive contact between vertical surfaces 83 of the ears and 96 of the shell acting through the head 23 of the core and wrench 87 rotates the core a few times upwardly, thereby permitting air to escape. Further revolution of the shell lifts the formation so that wrench elements 87 and head 23 no longer engage. Sufficient air escapes to require reinflation and to signal carelessness or larceny, but not enough quickly to deflate the tire as previously described.

The position and length of the internal threads 107 of the shell structure and the external threads 17 of the stem in relation to each other and to the position of the wrench formation 87 determine whether the wrench is lifted clear of the motion-receiving head 23 after or before the core is completely unseated. In the former case, illustrated in Figures 1 et. seq., the core is lifted clear and the air escapes immediately. In the later case, illustrated in Figures 8 to 14, the core is merely unloosened and air escapes slowly. Either arrangement of length of threads and their position relative to each other and to the position of the wrench formation along the principal axis may be employed interchangeably with the other elements of my device.

Figure 14:
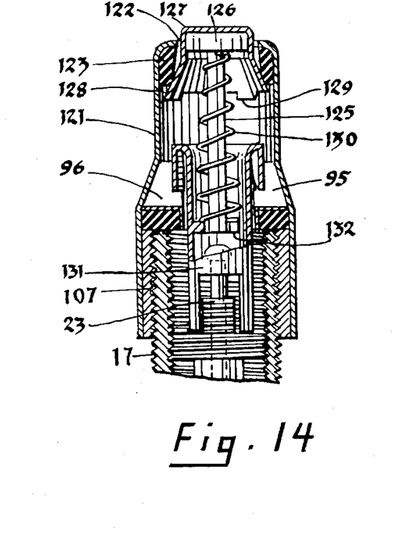
Figure 14 (Sheet 3) is a vertical section of a third embodiment of my invention, resembling that of Figure 8 except as to its plunger and seating thereof. The showing of Figure 14 differs from that of Figure 8 in that in Figure 14 the parts are illustrated in cooperating position, with both the core and protective cap completely seated.

The form of Figure 14 differs from that immediately previously described in two important particulars, namely the formation of the valve head which is the operating instrumentality of my auxiliary valve and the shape and support of the operating spring. The seat member and threaded retaining member are the same.

Operating shell 121 is shaped similarly to shell 100. Below opening 122 at the top of the shell a rubber gasket 123 is molded into position. An operating plunger includes a rod 125 formed with or attached to a head 126. An irregularly shaped closure shell 127 is pressed into position over this head. The outer and intermediate portion of its skirt 128, inclined outwardly from the vertical and downwardly, engages gasket 123 to form a firm air closure. Ears 129 projecting further downwardly and away or further outwardly from the axis of the device at the bottom of this skirt engage the inside of outer or operating shell 121 to guide the closure shell 127 by contact with the inside surface of the operating shell. Space between these ears permits air to pass. A conical spring 130 is slipped over this plunger rod 125. Clutch member 131 has inwardly extending lugs 132 guiding the stem 125 and forming a seat with a central opening, to support the lower end of this spring, as described and more fully illustrated just above. Assembly and operation of this embodiment is the same as previously described.

In Figure 14 the wrench or clutch member 131 is shown after its wrench formation has engaged the sides of the motion-receiving head. In Figure 8, however, the ratchet member is seen on the top of the head, before it has been rotated and spring-pressed into a position with engagement.

The advantages of my invention will have been made clear from the above portion of this specification, the drawings attached hereto and made a part hereof, and the sub-joined claims. These advantages include the provision of an improved valve device which combines a protective cap, through which without its removal a fluid such as air may be introduced and retained, and a clutch and wrench formation, operable from the exterior of said device as by the screwing of said cap to or from protective position upon a valve stem, by which a valve core is seated and alternatively unseated. They also include provisions of improved valve and closure mechanisms and elements thereof and arrangement and control thereof.

I claim:

1. For use with a main tube valve having an inner core rotatably threaded therewithin and having a seat for said core, an auxiliary valve; said auxiliary valve having means for attachment to said main tube valve, a wrench device mounted within said auxiliary valve and engageable with said core when said auxiliary valve is attached to said main valve and having formations for rotating said core of said main valve to and from seated position, and an operable closure structure which when said auxiliary valve is attached to said main valve and said core is in said seated position upon being depressed opens said main valve and thereby forms an air passage through both of said valves.

2. For use with a main gas-container valve having an inner core rotatably threaded therewithin and having a seat for said core, an auxiliary valve; said auxiliary valve having means for attachment to said main valve, a slip clutch engageable with said core when said auxiliary valve is attached to said main valve and having formations for rotating said core of said main valve to and from seated position, and an operable closure structure which when said auxiliary valve is attached to said main valve and said core is in said seated position upon being depressed opens said main valve and thereby forms an air passage through both of said valves.

3. Apparatus according to claim 2, said formations of said slip clutch having instrumentalities which upon the first portion of the movement of said auxiliary valve into place upon said main valve rotate said core to seat it and upon the further downward movement of said auxiliary valve provide lost motion so that said auxiliary valve may be firmly seated after said core has been seated and upon the upward movement of said auxiliary tire valve positively rotate said core in the opposite direction to unseat it.

4. For use with a main tube valve having an inner core threaded therewithin for movement to and from seated position and a valve-opening plunger, an auxiliary tube valve; said auxiliary valve having means for attachment to said main valve, a closure structure which when said auxiliary valve is attached to said main valve is disposed in position to engage and operate said plunger and to open said main valve thereby forming an air passage through both of said valves, a wrench formation for moving said core of said main valve alternatively to seat and unseat said core, and means for mounting said wrench formation within said auxiliary valve, said mounting means including instrumentalities operatively interconnected to said attachment means which operate said wrench formation to seat said core when said auxiliary valve is being attached to said main valve and operates said formation to unseat said core when said auxiliary valve is being detached therefrom.

5. A valve device adapted for use with an attachment to a container for gas, said valve device comprising a main tubular stem, a core threaded therewithin for movement in one or a first direction to seated position and in another or second direction to unseated position, motion-receiving surfaces upon said core, a valve member mounted within said core and bodily movable therewith and when said valve is seated alternatively operable to retain gas within said container and to release it therefrom, the movement of said core in said second direction also unseating said valve member, and an operating shell threaded upon the upper end of said stem for alternative movement along the principal axis thereof in each of said directions, a wrench formation mounted within said shell for bodily movement therewith, motion transmitting surfaces positioned upon said wrench formation for engagement with said motion-receiving surfaces of said core for moving said core to seated position as said shell is screwed in said first direction and for moving said core from seated position as said shell is screwed in said second direction and hence releases the gas from said container.

6. A valve device adapted for use with an attachment to a gas container; said valve device having a lower stem and having a tubular passageway therewithin, the external surface of said stem and the internal surface of said passageway being threaded, a core having external threads for co-action with said internal threads and a motion-receiving head, a plunger mounted upon said core for bodily movement therewith and operative movement relatively thereto, a spring mounted upon said core for pressing said plunger upwardly, said passageway being closed upon the upward movement of said plunger and opened upon downward movement thereof; that improvement characterized by, in combination, an upper tubular shell formation having threads whereby it may be mounted upon said external thread of said stem and screwed alternatively up and down in relation thereto, said upper shell including a channel aligned with said previously mentioned passageway, a spring-pressed plunger mounted within said upper shell for movement from and to operative contact with said first mentioned plunger for operating said plunger, and an operable wrench and clutch formation mounted within said device for operative movement, said clutch and wrench formation having motion-transmitting surfaces engageable with motion-receiving surfaces of said core and said formation also having surfaces which connect it with said upper shell for movement therewith whereby when said upper shell is screwed downwardly said motion-transmitting surfaces engage said motion-receiving surfaces and move said core downwardly to seat it and when said upper shell is screwed upwardly said surfaces engage and move said core upwardly to unseat it.

7. A valve device for a tube comprising in combination a hollow stem, a core threaded within said stem, a primary spring for moving said plunger to closing position, said primary plunger and spring being mounted upon said core for bodily movement therewith and operative movement relatively thereto, the upper portion of said core having motion-receiving surfaces, both vertical and inclined, a shell having an opening in an upper surface thereof, said shell and said stem having cooperating threads by which said shell may be mounted upon the upper portion of said stem, an auxiliary plunger mounted within said shell for bodily movement therewith and operative movement relatively thereto, said auxiliary plunger having at one end a closure for said opening and the other end being adapted to engage and operate said primary plunger, a resilient clutch mounted within said device for seating and unseating said core, said clutch having motion-transmitting surfaces both vertical and inclined, said motion-receiving and said motion-transmitting surfaces being so arranged that when said clutch is operated to seat said valve said inclined surfaces engage, thereby providing an impositive drive and lost motion, and when said clutch is operated to unseat said core said vertical surfaces engage thereby providing a positive drive, and instrumentalities operable from the exterior of said device for operating said wrench and clutch formation.

8. A valve device for a tube comprising in combination: a hollow stem, a core threaded within said stem, a primary plunger for closing the opening in said stem, a primary spring for moving said plunger to closing position, said primary plunger and spring being mounted upon said core for bodily movement therewith and operative movement relatively thereto, the upper portion of said core having motion-receiving surfaces, both vertical and inclined, a shell having an opening in an upper surface thereof, said shell and said stem having cooperating threads by which said shell may be mounted upon the upper portion of said stem, an auxiliary plunger mounted within said shell for bodily movement therewith and operative movement relatively thereto, said auxiliary plunger having at one end a closure for said opening and the other end being adapted to engage and operate said primary plunger, a resilient clutch mounted within said device for seating and unseating said core, said clutch having motion-transmitting surfaces both vertical and inclined, said motion-receiving and said motion-transmitting surfaces being so arranged that when said clutch is operated to seat said valve said inclined surfaces engage, thereby providing an impositive drive and lost motion, and when said clutch is operated to unseat said core said vertical surfaces engage, thereby providing a positive drive, and an operative connection between said shell and said clutch for operating said clutch to seat said core when said shell is placed upon said stem and to unseat said core when it is removed therefrom.

9. In an auxiliary valve having closure means and means for attachment to a main tube valve, said main valve having an inner core threaded therewithin for movement to and from seated position and a plunger for opening and closing said main valve when said core is in seated position operated by said closure means of said auxiliary valve; in combination, a cap, a mount for said cap upon the exterior of said main valve, a wrench formation mounted within said cap and upon the attachment of said cap to said main valve positioned to engage said inner core, and a member operable from the exterior of said cap for revolving said wrench formation for alternatively seating and unseating said inner core.

10. In an auxiliary valve having closure means and means for attachment to a main tube valve, said main valve having an inner core threaded therewithin for rotation to and from seated position and a plunger for opening and closing said valve operated by said closure means of said auxiliary valve; in combination, a cap, a mount for said cap upon the exterior of said main valve, a wrench formation mounted within said cap and upon the attachment of said cap to said main valve adapted to engage said inner core, and a closure structure, said structure including instrumentalities operable from the exterior of said auxiliary valve for revolving said wrench for alternatively seating and unseating said inner core and for operating said closure means of said main valve to open and close said main valve when said core is seated.

11. In a valve device having a tubular casing through which gas flows, a core movable to and from seated position in said casing, closure means for alternatively opening and closing said passage when said core is seated, and a mount for the cap upon said casing; that improvement characterized by a wrench formation supported within and operated by said cap which upon the mounting of said cap upon said casing engages and seats said core, and an auxiliary closure formation supported by said cap therewithin which is adapted to engage and operate said closure means after said cap has been mounted and said core has been seated.

12. An auxiliary tube valve adapted for use with a main tube valve; said main valve having internal and external threads, a core threaded for rotation therewithin, said core terminating upwardly in a motion-receiving head, and a spring-pressed plunger movable within said core for operating the valve; said auxiliary valve comprising an operating shell structure having an internal thread adapted to be mounted upon said external thread of said main valve for rotation thereupon and relatively thereto and being formed with an air-admitting opening, a wrench formation disposed within said shell structure and rotatable by operative contact therewith, said formation having motion-transmitting surfaces adapted for co-action with said head to rotate said core, and an auxiliary spring-pressed plunger for said auxiliary valve, said auxiliary plunger having at its upper end a closure for said opening adapted to seal said auxiliary valve and passing through said wrench formation for engagement of its lower end with the plunger of said main valve whereby upon the depression of said closure said auxiliary plunger depresses said main plunger and opens the main valve.

13. An auxiliary valve adapted for use with a main tube valve; said main valve having an external thread and an internal thread, a core threaded for rotation within said internal thread, said core terminating upwardly in a head with motion-receiving surfaces having planes parallel to the principal axis of the valve, and a spring-pressed plunger movable within said core for operating the valve; said auxiliary valve comprising an operating shell structure having an internal thread adapted to be mounted upon said external thread of said main valve for rotation thereupon and being formed with an air-admitting opening in an upper surface thereof, a wrench formation disposed within said shell structure and rotatable by operative contact therewith, said formation having motion-transmitting vertical and inclined depending surfaces adapted for co-action with said motion-receiving surfaces of said head, the planes of said vertical surfaces being parallel to said axis, an auxiliary plunger for said auxiliary valve, said auxiliary plunger having at its upper end a closure adapted to seal said opening and passing through said wrench formation for engagement of its lower end with the plunger of said main valve, whereby upon the depression of said closure said auxiliary plunger depresses said main plunger and operates the main valve, and resilient means pressing said closure upwardly to seal said auxiliary valve and said motion-transmitting surfaces downwardly into engagement with said head, said inclined surfaces being so disposed that upon the downward movement of said operating shell structure upon said main valve they engage one of said surfaces of said head under the pressure of said resilient means whereby said core is frictionally rotated toward its seated position and said vertical surfaces being so disposed that upon upward movement of said shell they are parallel to and positively engage a side of said head whereby upon such upward movement said core is positively rotated toward unseated position.

14. An auxiliary valve adapted for use with a main tube valve; said main tube valve having an external thread and an internal thread, a core threaded for rotation within said internal thread, said core terminating upwardly in a head with motion-receiving surfaces having planes parallel to the principal axis of the valve, and a spring-pressed plunger movable within said core for operating the valve; said auxiliary valve comprising an operating shell structure having an internal thread adapted to be mounted upon said external thread of said main valve for rotation thereupon and being formed with an air-admitting opening, means for closing said opening and concomitantly operating said plunger of said main valve, a wrench formation disposed within said shell structure and rotatable by operative contact therewith, said wrench formation having motion-transmitting vertical and inclined depending surfaces adapted for co-action with said motion-receiving surfaces of said head, the planes of said vertical surfaces being parallel to said axis, resilient means for pressing said motion-transmitting surfaces downwardly into engagement with said head, said inclined surfaces being so disposed that upon the downward movement of said operating shell structure upon said main valve they engage one of said surfaces of said head of said core under the pressure of said resilient means whereby said core is frictionally rotated toward its seated position, lost motion being thereby provided whereby said shell may be completely seated after said core has been seated, and said vertical surfaces being so disposed that upon upward movement of said shell they are parallel to and positively engage a side of said head whereby upon such upward movement said core is positively rotated toward unseated position.

15. A removable protective dust cap for use with any of a plurality of conventional tube valves; each of said valves having an external thread for the mounting of the cap thereupon and an internal thread for the reception of an externally threaded core, said core upon its upper end having a motion-receiving head and having a spring-pressed plunger mounted thereupon for bodily movement therewith and when said valve is seated operable movement to and from closed position; an internal thread upon said cap for cooperation with the external thread of said tube valve whereby said cap can be removably mounted upon said tube valve; a wrench formation mounted within said protective cap and bodily movable therewith and operated thereby and extending downwardly from the interior of the upper portion thereof and so positioned that when said cap is mounted upon the tube valve it engages said head of the core of said tube valve and is effective to seat it when said cap is screwed downwardly upon said valve and to unseat it when said cap is screwed upwardly or in a contrary direction for its removal from said valve.

16. A protective cap for use with a tube valve which has an inner core threaded therewithin having an upwardly extending motion-receiving head and an exterior thread for the reception of a cap; said protective cap comprising an outer protective shell structure, an internal thread thereupon for engagement with the external thread of said valve, a wrench formation, and a mount including a resilient member for positioning said wrench formation within said shell, whereby as said dust cap is screwed down upon said valve said wrench formation yieldingly engages said motion-receiving head and seats said core.

17. A protective cap for use with a tube valve having a hollow stem with an external thread for the reception of a cap and an internal thread for the reception of a threaded core, and a threaded core, movement of said core downwardly on said threads to seated position placing said valve in operable condition and contrary movement upwardly releasing air from said tube valve; that improvement characterized by said cap including, in combination, an outer protective shell structure, said shell structure having internal threads cooperating with the external threads of said valve stem, and a clutch structure mounted therewithin and operable thereby and engageable with said valve core when said cap is screwed downwardly for seating said core, said clutch structure including a slip device which allows further downward movement of said protective cap, upward movement operating said clutch structure to unseat said valve.

18. A removable protective cap for a gas-container valve; said valve comprising a tubular casing adapted to be mounted upon said gas container and extending away therefrom, said casing having an external thread and an internal thread, a core threaded within said internal thread, a valve mechanism within said core, the loosening of said core within said internal thread being effective to release gas from said tubular casing; said protective cap having an internal thread adapted to cooperate with the external thread of said casing; that improvement characterized by a wrench formation mounted within said protective cap and effective when said cap is screwed in one direction prior to its removal for loosening said core, and means mounted upon said cap for operating said valve mechanism when said protective cap is in protective position upon said stem.

19. In an auxiliary valve adapted for attachment to a main tube valve and when attached for rotation about the principal or vertical axis thereof, an outer operating shell structure, a clutch or wrench formation, and a mount for positioning said formation within said shell, outwardly extending motion-receiving connections upon said formation for operation by said shell structure when it is rotated and downwardly extending wrench formations accessible from the lower end of said shell, said end being open.

20. In an auxiliary valve adapted for attachment to a main tube valve and when attached for rotation about the principal or vertical axis thereof, an operating shell structure, an opening in an upper surface of said shell and the lower end of said shell being open, a plunger mounted within said shell for movement along said axis, a closure mounted upon the upward end of said plunger for blocking said opening and an operating formation mounted upon the lower end of said plunger, a wrench formation, a mount for disposing said formation within said shell relatively adjacent the lower portion of said shell, resilient means pressing said plunger upwardly and said wrench downwardly, and an operating connection between said shell and said wrench formation for operating said wrench by the rotation of said shell.

21. In an auxiliary valve adapted for use with an attachment to a main valve for a tube; said auxiliary valve comprising, in combination, an operating shell rotationally movable about the axis of said main valve, said shell being formed with an opening in its upper surface, means for attaching said operating shell to said main valve for such movement, a closeable air passage through both of said valves being formed when said auxiliary valve is attached to said main valve, a tubular formation, a mount by which said formation is positioned within said shell with its principal or vertical axis coinciding with that of said valves, a plunger disposed within said tubular formation and guided thereby for longitudinal movement in each of two directions along the principal or vertical axis of said auxiliary valve, a closure formation for said opening, said closure being mounted upon the upper end of said plunger, whereby upward movement of said plunger closes the opening in said shell, a formation disposed upon the lower or other end of said plunger adapted upon downward movement of said plunger to open said main valve as said closure is removed from said opening, a seat extending inwardly from the inside of said tubular formation but not closing it, and a coiled spring directly extending between said seat and the under side of said closure for pressing said closure upwardly to close said opening, said plunger passing within said seat and the coils of said spring and being supported by said spring.

22. In an auxiliary valve adapted for use with a main valve for a tube; said auxiliary valve comprising, in combination, an operating shell rotationally movable about the longitudinal axis of said main valve, said shell being formed with an opening in its upper surface, means for attaching said operating shell to said main valve for such movement, a closeable air passage through both of said valves being formed when said auxiliary valve is attached to said main valve, a shoulder extending inwardly from said shell, a tubular formation supported by and depending from said shoulder and extending therebelow, a plunger disposed within said tubular formation and guided thereby for movement along said axis in each of two directions, a closure mounted upon the upper end of said plunger adapted upon upward movement of said plunger to close said opening in said shell, a formation upon its other or lower end adapted upon downward movement of said plunger to open said main valve as said closure is depressed and thereby removed from said opening, a seat extending inwardly from the inner surface of said tubular formation but not closing it, and a coiled spring directly extending between said seat and the under side of said closure for pressing said closure upwardly to close said opening, said plunger passing within said seat and the coils of said spring and being supported by said spring.

23. An auxiliary valve for use with a main tube valve; said main valve having external threads upon which said auxiliary valve can be mounted for rotation about the principal or vertical axis thereof, and a closable vertical air passage therethrough; said auxiliary valve comprising an operating shell, said shell being formed with an opening in its upper surface, a retainer ring disposed within and joined to said operating shell and having internal threads adapted to cooperate with the external threads of said main valve for mounting said shell and hence said auxiliary valve upon said main valve, a closeable air passage through said auxiliary valve in line with said closable air passage of said main valve when said auxiliary valve is mounted upon said main valve, a shoulder extending inwardly from said shell, a tubular formation depending from said shoulder, a plunger disposed within said tubular formation and guided thereby for movement in either of two directions, a closure mounted upon the upper end of said plunger adapted upon upward movement of said plunger to close the opening in said shell, an operating formation mounted upon the other or lower end of said plunger and so positioned that when said auxiliary valve is mounted upon said main valve upon downward movement of said plunger it opens said main valve as said closure is depressed and thereby removes it from said opening, said plunger being brought into operable relation with said main valve by the rotation of said shell upon the external threads of said main valve downwardly toward the main valve, a seat extending inwardly from the inside of said tubular formation but not closing it, and a coiled spring extending between said seat and said closure for pressing said closure upwardly to close said opening, said plunger passing through said seat and within the coils of said spring.

24. In an auxiliary valve adapted for use with a main tube valve, an operating shell rotationally movable about the longitudinal axis of said main valve, said shell being formed with an air-admitting opening in its upper surface, means for attaching said operating shell to said main valve for such movement, a closeable air passage through both of said valves being formed when said auxiliary valve is attached to said main valve, a shoulder extending inwardly from said shell, a tubular formation supported by and depending from said shoulder and extending therebelow, a plunger disposed within said tubular formation and guided thereby for movement along said axis in either of two directions, a closure mounted upon the upper end of said plunger and having an upper portion shaped and disposed to close said opening and a skirt extending therebelow within said shell, the lower portion of said skirt flaring further outwardly away from the principal or vertical axis of said plunger, said skirt being extended further downwardly and further outwardly from said axis into spaced ears which make contact with the inner surfaces of said shell in order to guide said plunger as it is moved along its principal axis, a formation upon the lower end of said plunger adapted upon downward movement of said plunger to open said main valve as said closure is depressed and thereby removed from said opening, a seat extending inwardly from the inner surface of said tubular formation but not closing it, and a coiled spring directly extending between said seat and the under side of said closure for pressing said closure upwardly to close said opening, said plunger passing within said seat and the coils of said spring and being supported by said spring.

25. An auxiliary valve for use with a main tube valve; said main valve having external threads and internal threads, a threaded core mounted upon said internal threads, said core terminating upwardly in a motion-receiving head or extension, a spring-pressed plunger mounted within said core for movement upwardly to open said valve; said auxiliary valve having an outer operating shell structure provided with an opening in the top thereof and having internal threads adapted to cooperate with the external threads of said main valve, an operating seat, a connection between said shell and said seat whereby said shell supports and moves said seat therewithin, the upper portion of said seat being formed into shoulders having motion-transmitting surfaces each with oppositely disposed surfaces one of which is parallel to the longitudinal axis of the valve and the other of which is inclined at an angle thereto and away from said oppositely disposed surface, a clutch and wrench formation, said formation having an annular rim disposed above said shoulders and formed with depending motion-transmitting ears each with one straight side parallel to and adapted to be engaged and positively moved by the straight or vertical sides of said shoulders and oppositely disposed inclined sides adapted to be engaged and frictionally moved by said inclined surfaces of said shoulders, the lower portion of said formation being formed into a wrench like opening for engagement with said head of said core, a plunger disposed within said shell and movable along the longitudinal axis thereof, said plunger having an upper closure head disposed within and adapted to close said opening in said outer shell, the lower end of said plunger being adapted to engage and cooperate with the main valve when said auxiliary valve is disposed thereupon, spring means for moving said closure head upwardly or to closing position and said wrench and clutch formation downwardly toward said shoulders, the rotation of said operating shell communicating with said operating seat in a downward or closing direction being effective to place said inclined surfaces thereof in motion-transmitting frictional relation with said inclined motion-receiving surfaces of said ears and under the influence of said spring means to rotate said wrench and clutch formation, said wrench-like opening engaging said motion-receiving head and being effective to seat said core of said main valve, said inclined surface and said spring being effective to provide the lost motion necessary for further movement of said operating shell into completely protective or seated position, contrary or upward movement of said shell as said shell is unscrewed being effective upon the straight sides of said operating shoulder and ears positively to move said core to unseat it, said tubular member being bodily raised by said upward or unscrewing movement of said outer operating shell.

26. An auxiliary valve for use with a main tube valve; said main valve having external threads and internal threads, a threaded core mounted upon said internal threads, said core terminating upwardly in a motion-receiving head, a spring-pressed plunger mounted within said core for movement upwardly to open said valve; said auxiliary valve having an outer operating shell structure with an opening in the top thereof and with internal threads to cooperate with said external threads, an operating seat movable with said structure, said seat having a central depending tube coaxial with vertical axis of said auxiliary valve and its upper portion having shoulders extending away from said tubular opening generally at right angles to said longitudinal axis, said shoulders having motion-transmitting openings each with oppositely disposed surfaces one of which is parallel to said axes and the other of which is inclined at an angle thereto and away from said oppositely disposed surface, a tubular wrench formation, said formation having a main tubular portion disposed about said principal axis, an annular rim extending outwardly from the upper portion of said tubular formation, said rim having depending motion-transmitting ears each with one straight side parallel to and adapted to be engaged and positively moved by the straight or vertical sides of said ears and oppositely disposed inclined sides adapted to be engaged and frictionally moved by said inclined surfaces of said ears, the lower portion of said tube being formed into a wrench-like opening for positive engagement with said motion-receiving head of said core, a plunger within said tubular formation and movable along the said axis, a closure head disposable within and to close said opening in said outer shell, said closure head being positioned upon the upper end of said plunger, the lower end of said plunger engaging the plunger of the main valve when said auxiliary valve is disposed thereupon, and spring means for moving said closure head upwardly and said tubular formation downwardly or toward the core.

27. An auxiliary valve for use with a main tube valve; said main valve having external threads and internal threads, a threaded core mounted upon said internal threads, said core terminating upwardly in a motion-receiving head or extension with sides parallel to the principal or vertical axis of the valve, and a spring-pressed plunger mounted within said core for movement upwardly to close said valve and downwardly to open said valve;

said auxiliary valve having an outer operating shell structure provided with an opening in the top thereof and with motion-transmitting protuberances in the sides thereof and having internal threads for engagement with said external threads of said main valve, a seat member, said seat member having a central tubular opening the axis of which coincides with the principal axes of said auxiliary and main valves and having a rim extending away from said tubular opening at right angles thereto, a tubular wrench formation having a main cylindrical portion disposed about said principal axis and a rim extending therefrom at right angles to said axis and disposed above said rim of said seat member, said rim having motion-receiving extensions disposed within the interior of said protuberances of said operating shell whereby the revolution of said shell rotates said wrench formation, said tubular lower portion of said member extending downwardly through said central opening of said seat member, said tubular member also being formed with a projection extending inwardly and forming a seat, a plunger disposed within said tubular member and movable along the longitudinal axis thereof and clear of said projection, a closure head disposable within and then adapted to close an opening in the top of said outer shell, said closure head being mounted upon the upper end of said auxiliary plunger, the lower end of said plunger being adapted to engage and cooperate with a plunger of the main valve when said auxiliary valve is disposed thereupon, a spring extending between said seat formation and the under portion of said closure head for pressing said head upwardly or to closing position and said tubular formation downwardly, and a wrench formation in the lower end of said tube, said wrench formation comprising two opposite openings each with one surface parallel to said principal axes and with the other surface inclined toward said axes, said inclined surfaces being disposed to engage the sides of said motion-receiving head when said wrench is rotated in one direction as said operating shell is screwed upon said main valve and under the influence of said spring to rotate said core to seat it, such engagement of said inclined surfaces under the pressure of said spring furnishing lost motion so that said auxiliary valve may be screwed into seated position upon said main valve after said core has been seated within said main valve, and said surfaces parallel to said axis being disposed to engage said sides when said operating shell is unscrewed thereby positively unseating said core, the length and position of the internal threads of said operating shell in relation to those of said main valve and their position in relation to each other and the position of said wrench formation along the principal or vertical axis being such that said core is not completely unscrewed from its threads within the main valve but merely loosened before said operating shell has been completely unscrewed from said main valve.

References Cited in the file of this patent

UNITED STATES PATENTS

| | | |
|---|---|---|
| 1,403,484 | Clifford | Jan. 17, 1922 |
| 1,542,992 | Downs | June 23, 1925 |
| 1,865,580 | Michelin | July 5, 1932 |
| 1,969,224 | Lear | Aug. 7, 1934 |
| 2,128,623 | Stuck | Aug. 30, 1938 |
| 2,135,869 | Engel | Nov. 8, 1938 |
| 2,198,122 | Martin | Apr. 23, 1940 |
| 2,231,449 | Keefe | Feb. 11, 1941 |